Figure 1:
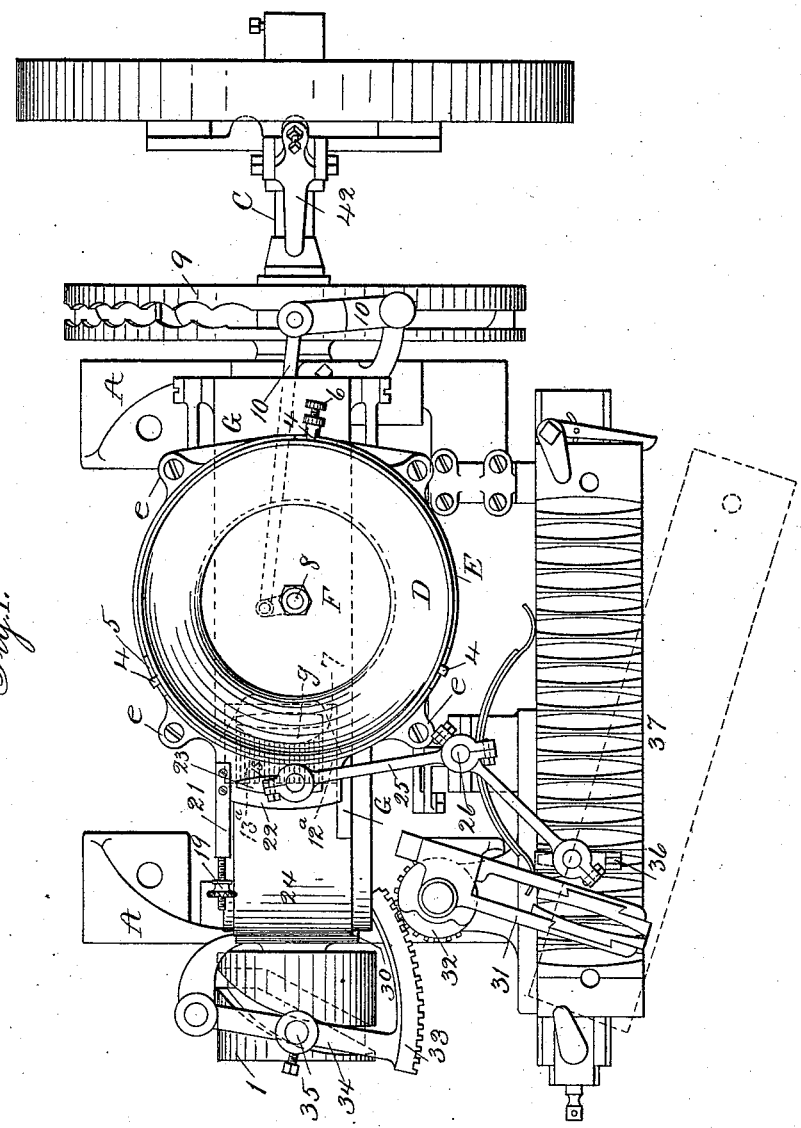

(No Model.) 5 Sheets—Sheet 1.

F. C. MILLER.
CIGAR BUNCH MACHINE.

No. 567,350. Patented Sept. 8, 1896.

Witnesses
J. G. Lepper
Geo. L. Wheelock

Inventor
Fredrick C. Miller,
By his Attorneys
Knight Bros (No Model.)  5 Sheets—Sheet 2.
F. C. MILLER.
CIGAR BUNCH MACHINE.
No. 567,350. Patented Sept. 8, 1896.
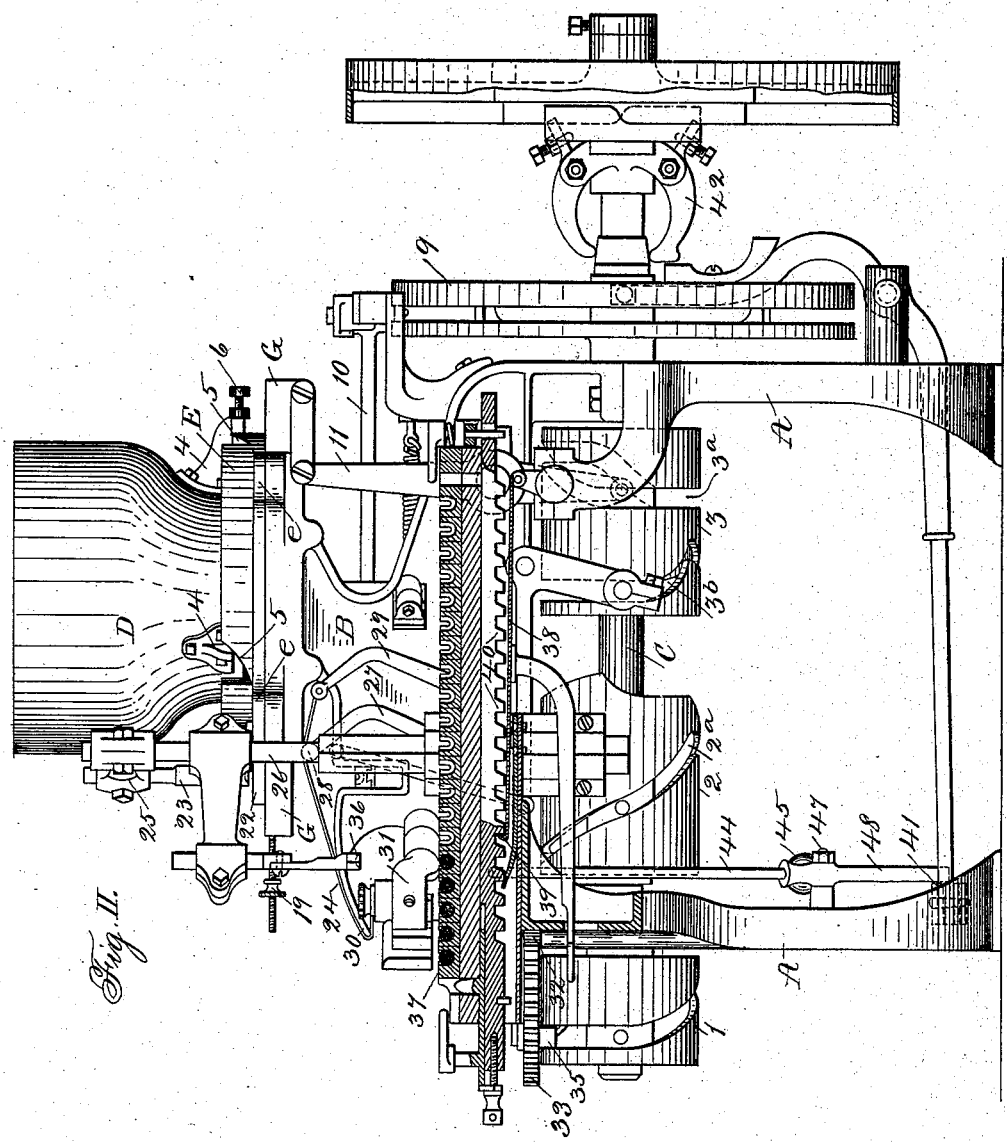
Witnesses
J. G. Lepper
Geo. F. Wheelock
Inventor
Fredrick C. Miller,
By his Attorneys
Knight Bros.

(No Model.) 5 Sheets—Sheet 3.
F. C. MILLER.
CIGAR BUNCH MACHINE.
No. 567,350. Patented Sept. 8, 1896.
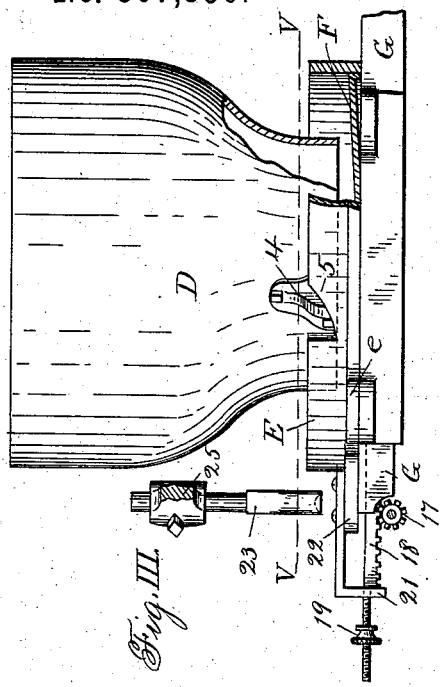
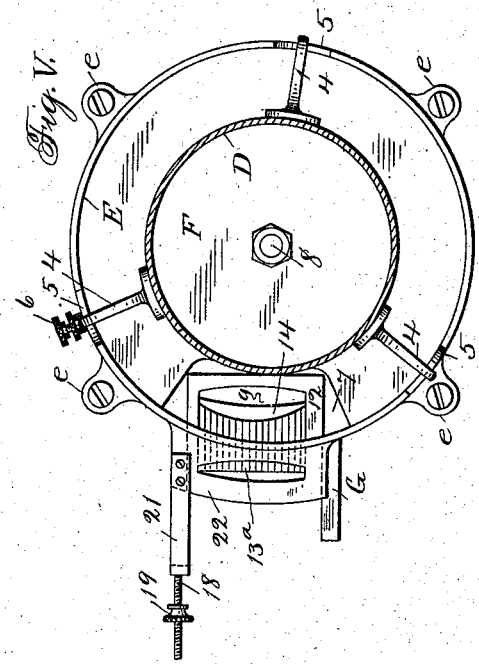
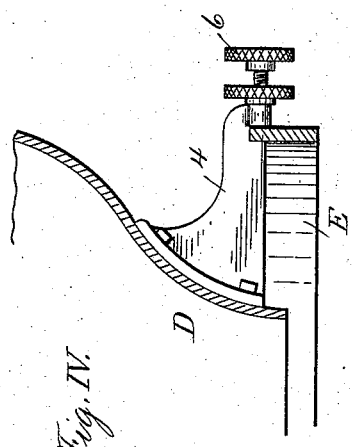
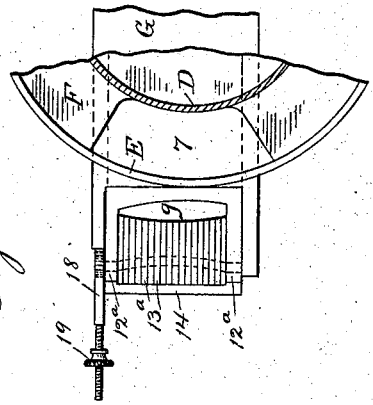
Witnesses
J. G. Zopper.
Geo. L. Wheelock.
Inventor
Fredrick C. Miller
By his Attorneys
Knight Bros (No Model.) 5 Sheets—Sheet 4.
F. C. MILLER.
CIGAR BUNCH MACHINE.
No. 567,350. Patented Sept. 8, 1896.
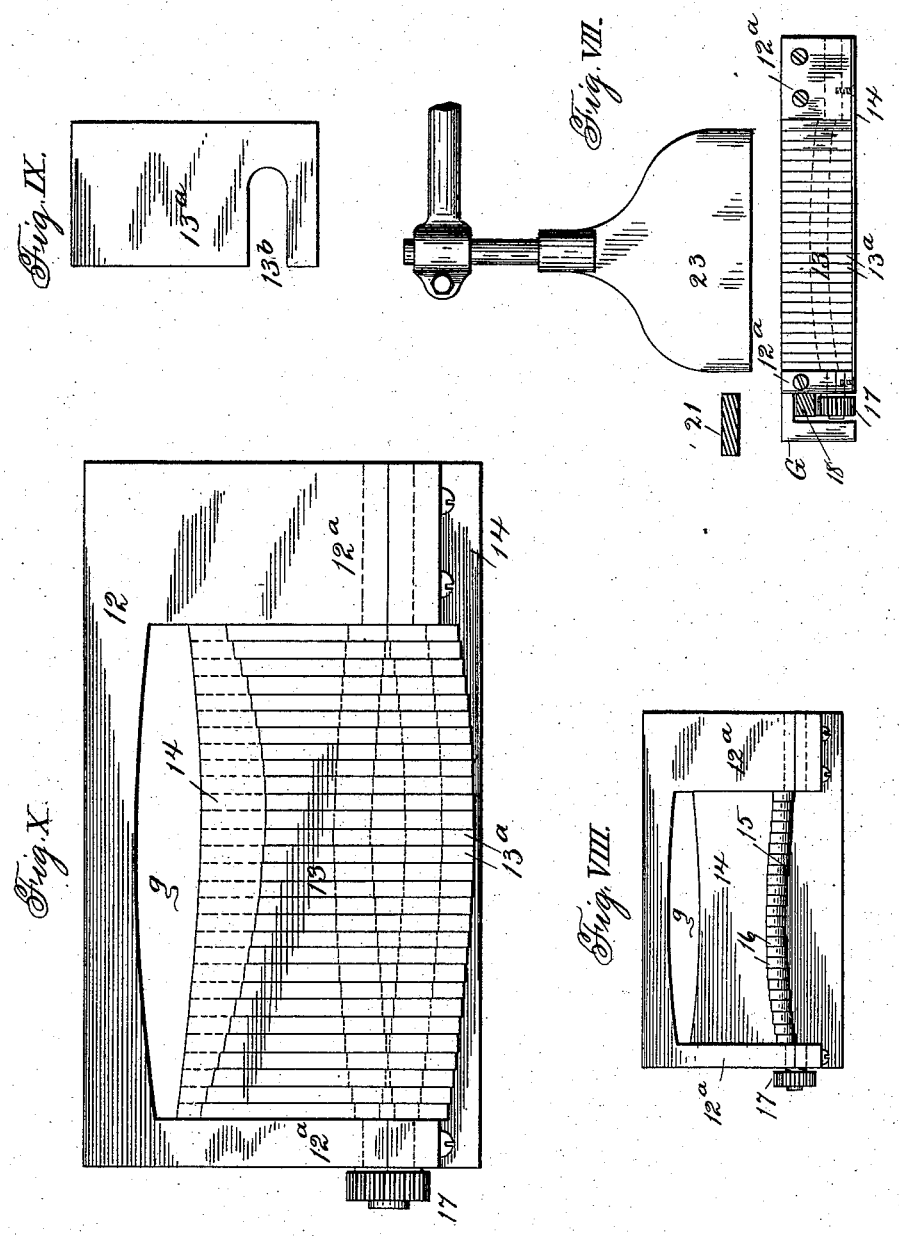
Witnesses
J. G. Lepper
Geo. L. Wheelock
Inventor
Fredrick C. Miller,
By his Attorneys
Knight Bros.

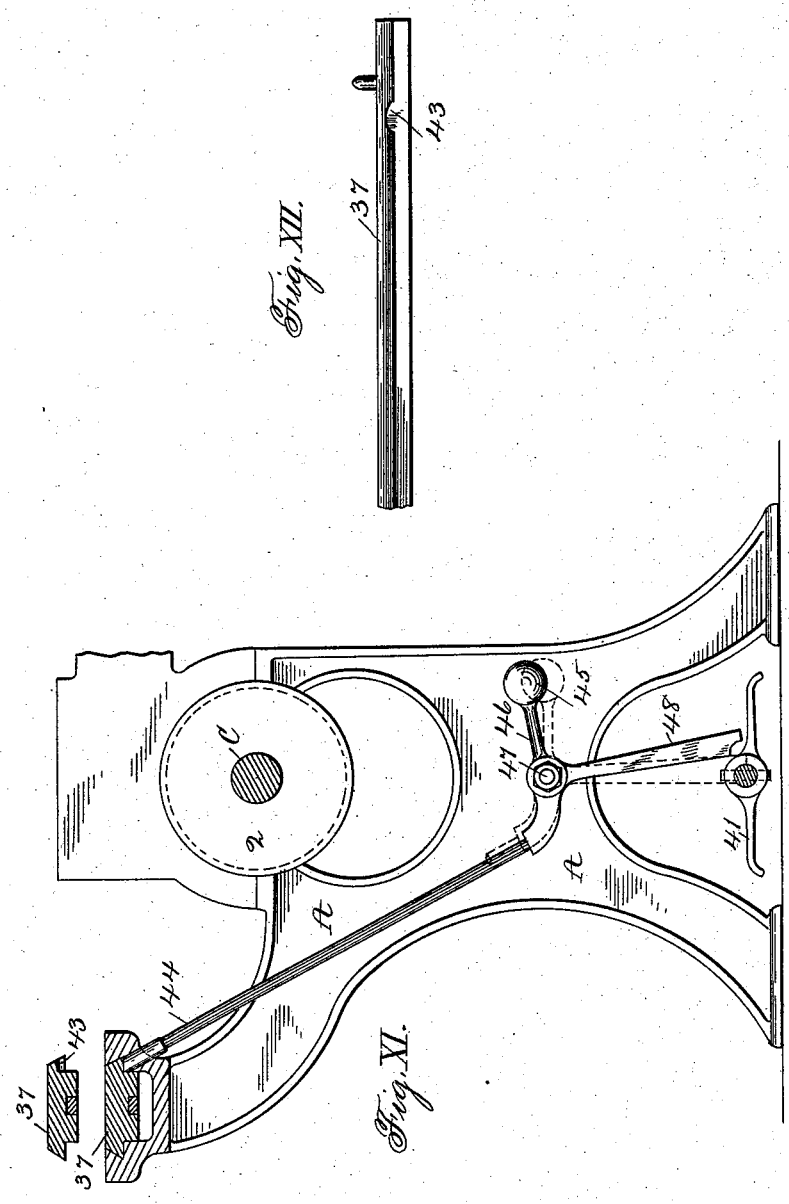

UNITED STATES PATENT OFFICE.

FREDRICK C. MILLER, OF NEWPORT, KENTUCKY, ASSIGNOR TO THE MILLER, DU BRUL & PETERS MANUFACTURING COMPANY, OF CINCINNATI, OHIO, AND NEW YORK, N. Y.

CIGAR-BUNCH MACHINE.

SPECIFICATION forming part of Letters Patent No. 567,350, dated September 8, 1896.

Application filed May 6, 1890. Serial No. 350,780. (No model.)

*To all whom it may concern:*

Be it known that I, FREDRICK C. MILLER, a citizen of the United States, and a resident of Newport, in the county of Campbell and State of Kentucky, have invented certain new and useful Improvements in Cigar-Bunch Machines, of which the following is a specification.

My improvements consist, first, of a measuring device which is composed of a fixed part and a movable part formed in sections and having means in connection therewith for moving them to open and close the orifice or pocket in which the filler is formed and means for partially or wholly limiting the movement of the sections according to the shape and amount of pressure required to form the filler. When the sections are moved to open the orifice or pocket to allow a proper quantity of tobacco to be measured, and which is to correspond to the thickness at different parts of the filler which is to be made in accordance with its peculiar shape, they, in connection with the stationary part, form an irregular pocket, but when they are moved to close the orifice they correspond to the outline of the stationary part and form a regular pocket, which is the shape of the filler to be produced. Thus some of the sections will be moved farther than the others and at the points where the filler is thickest, so that finally an even filled and even compressed filler will be produced.

My improvements consist, secondly, in the peculiar construction of the hopper to feed the tobacco in the measuring device; and my invention consists, lastly, in an automatic device for locking the machine after the bunch has been deposited in the last cavity of the mold.

This invention is also designed as an improvement in parts on the machines shown and described in patents granted to me November 26, 1889, No. 416,117, and November 26, 1889, No. 416,065.

In order that my invention may be fully understood, I will proceed to describe the same with reference to the accompanying drawings, in which—

Figure I is a plan view of my improved machine. Fig. II is a side view thereof, partly in section. Fig. III is a side elevation of the hopper and measuring device, partly in section. Fig. IV is a detail view showing the fastening for securing the hopper to the auxiliary receptacle. Fig. V is a section on the line V V, Fig. III, showing the reciprocating measuring device in its inner position. Fig. VI is a view on the same section of but a portion of the hopper, showing the reciprocating measuring device in its outer position. Fig. VII is a view looking at the outer end of the reciprocating measuring device. Fig. VIII is a top view of a portion of the reciprocating measuring device, the movable section being removed. Fig. IX is a view showing one of the movable sections. Fig. X is a plan view (full size) of the fixed and movable die of the measuring device. Fig. XI is a view on the inner side of the treadle end of the machine, showing the locking mechanism. Fig. XII is a detail view of the movable rack.

Referring to the drawings, A represents the ends or supports of the frame-piece B, in which are journaled some of the parts of the machine.

C is the main driving-shaft, on which are fixed a series of cams 1, 2, and 3. These cams are so conformated and arranged that the respective elements of the machine operated by them will perform their appropriate work and pause until the other parts perform theirs and automatically resume work again.

D represents the hopper for the tobacco, which is constructed smaller at its lower end to provide a contracted opening. The contracted lower end of the hopper is telescoped within a ring or annulus E, that is provided with lugs *e* to secure it to the frame B of the machine. This ring and its bottom form an auxiliary receptacle with which the lower end of the hopper communicates, said hopper being raised a sufficient distance within the ring for this purpose. The hopper D is supported adjustably on the ring E by means of lugs or other supports 4, that rest upon inclines 5 of the ring in such manner as that when the hopper is turned one way or the other it is either elevated or lowered, and is held in its desired place by means of a set-screw 6. (See Fig. IV.)

Below the hopper proper and within the ring E is an oscillating plate F, which forms the bottom of the auxiliary receptacle and is provided with an opening 7, situated beneath the lower edge of the hopper. This plate is oscillated by its shaft 8, which is operated by means of the zigzag cam-wheel 9 and suitable connecting mechanism 10, more particularly described in my Patent No. 416,117 of November 26, 1889.

Below the oscillating plate F is a reciprocating slide or measuring device G, that is connected with the oscillating lever 11, which at its lower end fits in and is operated by the cam-groove $3^a$, formed in the cam 3. This slide has an orifice $g$, which, when the slide is in its innermost position, registers with the orifice 7 of the oscillating plate F. The object in constructing the hopper with the auxiliary receptacle shown is to permit an even or uniform feed of the tobacco into the measuring device, resulting in the production of more uniform fillers, effectuated by the lower end of the hopper being of less diameter and raised above the bottom of the auxiliary receptacle, which permits the tobacco to feed laterally out of the lower end of the hopper and against the inner side of the ring and above the orifice of the oscillating plate F, thus avoiding the varying weight of the bulk of tobacco in the hopper above the measuring-orifice, which would cause it to pack itself and prevent uniform filling, this being the defect in my machine covered by Patent No. 416,117. To feed the tobacco more perfectly into the measuring-receptacle, the oscillating plate may be inclined downwardly toward its orifice.

The measuring device of the reciprocating slide G is formed by a fixed part 12, fitted in a recess in the slide, and a movable part 13, constructed of sectional pieces $13^a$, fitted between lateral extensions $12^a$ of part 12. The orifice $g$, when the movable part is in its inner position, is approximately of the shape of the cigar-filler to be produced. The sectional pieces $13^a$ of the movable part are supported upon a thin plate 14, that spans the space between and is secured to the extensions $12^a$ of the part 12. The inner edge of the plate 14 forms, with the part 12, the shape of the filler, and when the slide is in its innermost position and the movable part moved out by devices presently to be described part of the filler is supported on the thin plate.

Journaled in the extensions $12^a$ of the fixed part is a shaft 15. The portion of the shaft 15 intermediate of its ends, upon which it turns, is made up of a series of contiguous cams 16, corresponding in number to the sections $13^a$, each with its axis normal to the axis of the shaft, but positioned so that the series conforms substantially to the longitudinal profile which it is desired to impart to the cigar-bunch. It thus constitutes the shaping-shaft of the machine $13^a$. These cams fit in vertical recesses $13^b$ in the under side of the sectional pieces, and they move up and down in these recesses as the shaft is rotated. On one end of the shaft is a pinion 17, that meshes with the rack-bar 18, fitted to slide in a groove in the slide. The outer end of the rack-bar 18 is screw-threaded to receive a nut 19, and it is supported and guided in an angle-lug 21. The rack-bar is also provided with a shoulder which bears against the said angle-lug 21 to limit the outward movement of the rack-bar.

When the reciprocating slide moves out from the hopper, the shoulder on the rack-bar 18 strikes the lug 21, and during this movement it causes the pinion 17 to rotate the shaft, which is at such a position as to move the sections so as to contract the measuring-orifice, and in this position the ends of the sections correspond to the outline of the stationary part. When the slide is retracted, it moves until the nut 19 strikes lug 21, which limits the rotation of the shaft and the sections correspondingly, and during this movement the measuring-orifice is expanded to receive a supply of tobacco from the hopper to form the filler. In this retracted position the sections form an irregular orifice, and it is at the latter movement that the main advantages of the construction of the movable part operated by the shaping-shaft is displayed. It will be seen that the shaft has more throw at some points intermediate its length than at others and at those points which are at the thicker part of the filler, and therefore the sections at the thicker part of the filler will have a movement proportionately and gradually greater than the sections toward the thinner part of the filler, so that in the retracted position of the sections the right quantity of tobacco will be received evenly the whole length of the filler, there being proportionately more near the thicker part of the filler than there would be were the movable part not made in sections gradually changing to the shape of the cigar. When, therefore, the sections are moved to close the measuring-orifice, there will be a gradually-increasing pressure at the thicker parts of the filler, and thus a more evenly-filled filler will be produced.

In Fig. X the measuring device is shown full size. The outer position of the sections is shown in full lines, and it will be noted that they move a distance equal to the width of that part of the orifice formed by the fixed part and the plate 14 opposite each. The inner position of the sectional pieces is represented by dotted lines.

When the shaping-shaft has enlarged the orifice to its fullest extent and it is desired to make the orifice smaller when in the act of receiving the tobacco, so as to make a smaller filler, the nut 19 is screwed outward and gives less throw to the shaft. Thereby this nut serves to adjust the size of the orifice of the measuring device to receive more or less tobacco for the filler desired. This nut may also serve to prevent any movement whatsoever of the shaft and thus hold the sections in closed position, as it often happens that by using a smaller scrap of tobacco for the filler it is not necessary to open and close the orifice. 22 represents a plate formed integral with the ring E, which extends over the measuring device and which is provided with an opening of the required shape, through which the plunger 23 passes when it pushes the filler through the orifice of the measuring device onto the bunch-rolling apron 24. The object of this plate is to allow the little particles of tobacco which accumulate on top of the measuring device to be drawn onto the orifice of the measuring device as it reciprocates under the plate. On the plate 22 the angle-lug 21, through which the rack-bar passes, is fastened. The plunger 23 is operated from groove $3^b$ in cam 3 by means of a suitable connecting mechanism, and it is supported on an arm 25, extending out from a sliding upright or bar 26. 27 is one of the filler-rolling arms of the filler-roller 28, said arms being oscillated from cam-groove $2^a$ and the apron being supported at its inner end by yielding arms 29, (only one of which is shown,) as in Patent No. 416,117. When the filler is rolled to the end of the table 30, it drops into the carrier 31, said carrier being operated at the proper time to move over the moving mold by means of the gear-wheel 32, segment-gear 33, oscillating lever 34, having a stud 35, and the cam 1, into the cam-groove of which the stud projects. Another plunger 36 delivers the fillers from the carrier 31 into the moving mold 37, situated at one side of the machine. The mechanism for shifting the mold one cavity at a time is the same as that shown and described in Patent No. 416,117, with the exception that the spring-arm 38 has a hook 39 at its end and the teeth of the mold-carrier 40 are presented in the opposite directions, so that the mold will be moved in a direction opposite to that shown in the said patent.

In my Patent No. 416,065 I have shown and described a friction-clutch that, when used with my machine, will be disengaged at the end of one revolution of the driving-shaft to stop the machine.

41 represents the treadle, which, when raised, throws the clutch 42 into action, and by the time a filler is delivered into one of the matrices of the mold the driving-shaft will have revolved once and the clutch disengaged, as stated. When the matrices are full, then the automatic locking device shown in Figs. II and XI comes into play. Near one end of the mold-carrier 40 is a notch or recess 43. This notch, when the matrices are full of bunches, comes opposite the upper end of the rod 44, which is projected into the notch by the action of the weight 45 at one end of a lever 46, the other end of the lever being connected with the lower end of the rod. The lever is pivoted at 47 intermediate of its ends at the end of the machine opposite the clutch mechanism. Pending from the lever 46 is a latch or detent 48, that is brought over the treadle by the action of the weight 45, thus locking the treadle so that it cannot be raised to start the machine until the mold-carrier has been drawn back to receive another mold. As the mold-carrier is withdrawn it presses the rod 44 downward, which withdraws the latch or detent from the treadle. The object of this automatic locking device is to prevent the operator making a surplus filler before the mold has been removed from the machine or depositing another filler over the one last made.

Having thus described my invention, the following is what I claim as new therein and desire to secure by Letters Patent:

1. In a cigar-bunch machine, the combination of a hopper for containing the tobacco, and a measuring device having communication with said hopper consisting of a stationary part and a movable part formed of sections which are adapted to be moved varying distances to open the orifice to allow for the varying thickness of the filler, and when moved to close the orifice correspond to the outline of the stationary part and press the filler to the desired shape, substantially as shown and described.

2. In a cigar-bunch machine, the combination of a hopper, and a measuring device in communication with said hopper composed of a stationary part and a movable part formed in sections, and suitable means for moving said sections to form an irregular-shaped orifice to receive the tobacco filler but when moved to closed position correspond to the outline of the stationary part, substantially as shown and described.

3. A device for forming cigar-fillers consisting of a stationary part and a movable part formed in sections which are adapted to be moved varying distances when the mold is opened to receive more or less tobacco at the points where the filler is to be thick or thin according to the shape of the filler desired, and when moved to closed position to compress the filler to form an even bunch, substantially as shown and described.

4. In a cigar-bunch machine, the combination of a hopper, and an adjustable measuring device in communication with the hopper and consisting of a stationary part, a relatively-movable part formed in sections and a shaping-shaft for operating the sections substantially as shown and described.

5. In a cigar-bunch machine, the combination of a hopper, and a measuring device in communication with the hopper and consisting of a stationary part, a relatively-movable part formed in sections, a shaping-shaft for moving the sections, and suitable means for regulating the throw of the shaft, substantially as and for the purpose set forth.

6. In a cigar-bunch machine, the combination of a hopper, and a measuring device in communication with said hopper, consisting of a stationary part and a relatively-movable part formed in sections, a shaping-shaft for moving said sections, a pinion on said shaft, a rack in engagement with said pinion and a guide for said rack, substantially as shown and described.

7. In a cigar-bunch machine, the combination of a hopper and a tobacco-measuring device consisting of a stationary part and a relatively-movable part formed of sections, a shaping-shaft for moving said sections and a rack and pinion for moving said shaft, substantially as shown and described.

8. A measuring device consisting of a stationary part, a relatively-movable part formed of sections and having suitable openings formed in said sections and a shaping-shaft fitting in said openings for moving the sections, substantially as shown and described.

9. In a cigar-bunch machine, the combination of a suitable bunch-forming device, a hopper formed with a contracted outlet end, a ring in which the lower end of the hopper telescopes and provided with an oscillating bottom and suitable means for adjustably supporting the hopper within the ring, substantially as shown and described.

10. In a cigar-bunch machine, the combination of the bunch-forming mechanism, the matrix for receiving the bunch, a carrier for said matrix, mechanism in connection with the carrier for moving it, and a controlling means for said mechanism, and an automatic locking mechanism for preventing further movement of the carrier when the matrix is full, consisting of a pivoted weighted lever adapted to engage a notch in the carrier and a detent for engagement with the controlling means for moving the carrier, substantially as shown and described.

11. In a cigar-bunch machine, the combination of a hopper, a ring for adjustably supporting the hopper, a plate provided with a suitable opening through which a plunger works formed integral with the ring, and a reciprocating measuring device working under the plate, substantially as shown and described.

12. In a cigar-bunch machine, the combination of a suitable bunch-forming device, a hopper formed with a contracted outlet end, a ring in which the lower end of the hopper telescopes and provided with an oscillating bottom, and suitable means for adjustably securing the hopper within the ring consisting of supporting-lugs on the hopper which rest on inclines on the ring and a set-screw for holding the hopper in its adjusted position.

FREDRICK C. MILLER.

Witnesses:
CHAS. NORDECK,
NAPOLEON DU BRUL.